US012219100B2

(12) United States Patent
Baba

(10) Patent No.: US 12,219,100 B2
(45) Date of Patent: Feb. 4, 2025

(54) MONITORING APPARATUS AND CONTROL METHOD THEREOF

(71) Applicant: CANON KABUSHIKI KAISHA, Tokyo (JP)

(72) Inventor: Shohei Baba, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/509,602

(22) Filed: Nov. 15, 2023

(65) Prior Publication Data

US 2024/0171689 A1    May 23, 2024

(30) Foreign Application Priority Data

Nov. 21, 2022 (JP) ................................. 2022-185753

(51) Int. Cl.
*H04N 1/00* (2006.01)
*H04N 1/44* (2006.01)

(52) U.S. Cl.
CPC ..... *H04N 1/00323* (2013.01); *H04N 1/00042* (2013.01); *H04N 1/00058* (2013.01); *H04N 1/00244* (2013.01); *H04N 1/00344* (2013.01); *H04N 1/4426* (2013.01)

(58) Field of Classification Search
None
See application file for complete search history.

(56) References Cited

U.S. PATENT DOCUMENTS

| 2011/0026942 A1* | 2/2011 | Naito | H04N 1/32662 399/10 |
| 2016/0065430 A1* | 3/2016 | Hirahara | H04L 41/0853 709/224 |
| 2016/0218945 A1* | 7/2016 | Hirahara | H04L 43/065 |
| 2017/0264779 A1* | 9/2017 | Hirahara | H04N 1/00061 |

(Continued)

FOREIGN PATENT DOCUMENTS

JP    2017126191 A    7/2017

OTHER PUBLICATIONS

Baba. Copending U.S. Appl. No. 18/509,789, filed Nov. 15, 2023 (is not included because the cited application is not yet available to the public and the Examiner has ready access to the cited application).

(Continued)

*Primary Examiner* — Dung D Tran
(74) *Attorney, Agent, or Firm* — ROSSI, KIMMS & McDOWELL LLP

(57) ABSTRACT

A monitoring apparatus manages a device that is a management target to be monitored, based on a list obtained from a management system. The apparatus periodically obtains from the target device, a state of registration of the device to the management system, the state being managed by the device. The apparatus specifies the target device as an unmatched device in a case where the state of registration obtained from the device indicates that the device is not registered, and instructs the unmatched device to transmit, to an authorization service, a request to register the unmatched device to the management system. The apparatus manages whether the state of registration of the unmatched device has changed to indicate that the device is registered after the instruction to transmit the request has been given.

6 Claims, 10 Drawing Sheets

(56) References Cited

U.S. PATENT DOCUMENTS

2020/0045204 A1* 2/2020 Niimoto ............... H04N 1/4426
2021/0274053 A1* 9/2021 Yano ..................... G06F 3/1287
2021/0336950 A1* 10/2021 Miyamoto ........... H04N 1/4413
2023/0291643 A1* 9/2023 Baba ....................... H04L 67/56

OTHER PUBLICATIONS

Yoshioka. Copending U.S. Appl. No. 18/509,753, filed Nov. 15, 2023 (is not included because the cited application is not yet available to the public and the Examiner has ready access to the cited application).

* cited by examiner

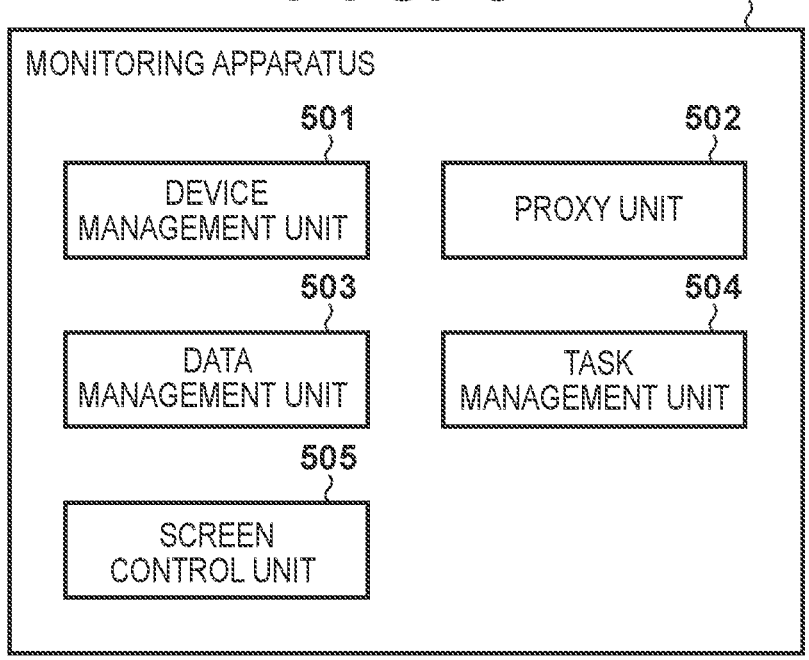
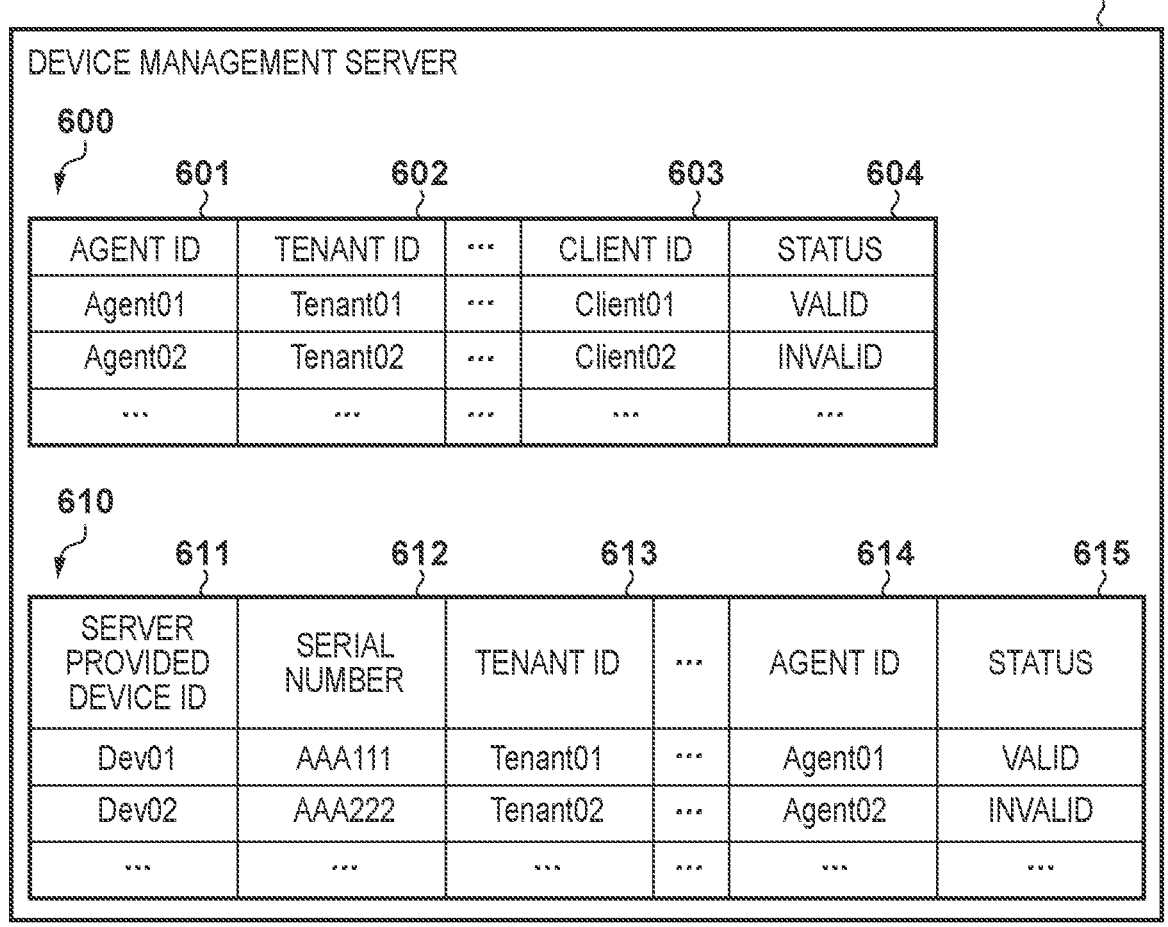

FIG. 7

| DEVICE ID 701 | SERIAL NUMBER 702 | IP ADDRESS 703 | ... | MANAGEMENT STATE 704 | REGISTRATION STATE 705 | MONITORING METHOD 706 | SERVER PROVIDED DEVICE ID 707 |
|---|---|---|---|---|---|---|---|
| 00000001 | AAA111 | 172.16.11.11 | ... | TARGET | REGISTERED | PROXY | Dev01 |
| 00000002 | AAA222 | 172.16.11.22 | ... | TARGET | NOT REGISTERED | POLLING | Dev02 |
| 00000003 | AAA333 | 172.16.11.33 | ... | NOT TARGETED | NOT REGISTERED | POLLING | Dev03 |
| ... | ... | ... | ... | ... | ... | ... | ... |

MONITORING APPARATUS 700 — 101

FIG. 8

AUTHORIZATION SERVER

800

| ACTIVATION CODE | SERIAL NUMBER | DEVICE REGISTRATION KEY | EXPIRATION DATE | ... |
|---|---|---|---|---|
| ai30s0qiq0w | Dev01 | 40hoa89f8k | 2022/04/15 16:32:14 | ... |
| ... | ... | ... | ... | ... |

810

| DEVICE REGISTRATION KEY | TENANT ID | EXPIRATION DATE | ... |
|---|---|---|---|
| 40hoa89f8k | Tenant01 | 2022/04/15 15:42:24 | ... |
| ... | ... | ... | ... |

820

| CLIENT ID | SERIAL NUMBER | TENANT ID | ... | STATUS |
|---|---|---|---|---|
| Dev01 | AAA111 | Tenant01 | ... | VALID |
| Dev02 | AAA222 | Tenant02 | ... | INVALID |
| ... | ... | ... | ... | ... |

830

| CLIENT ID | CREDENTIAL | ... |
|---|---|---|
| Dev01 | il8fs36gfw | ... |
| ... | ... | ... |

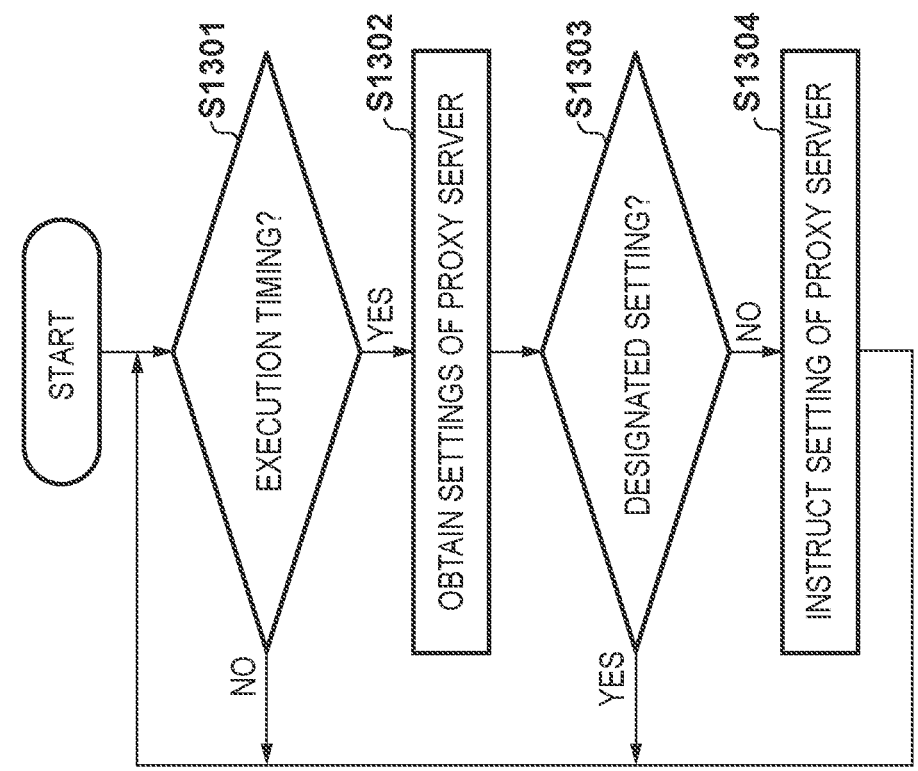
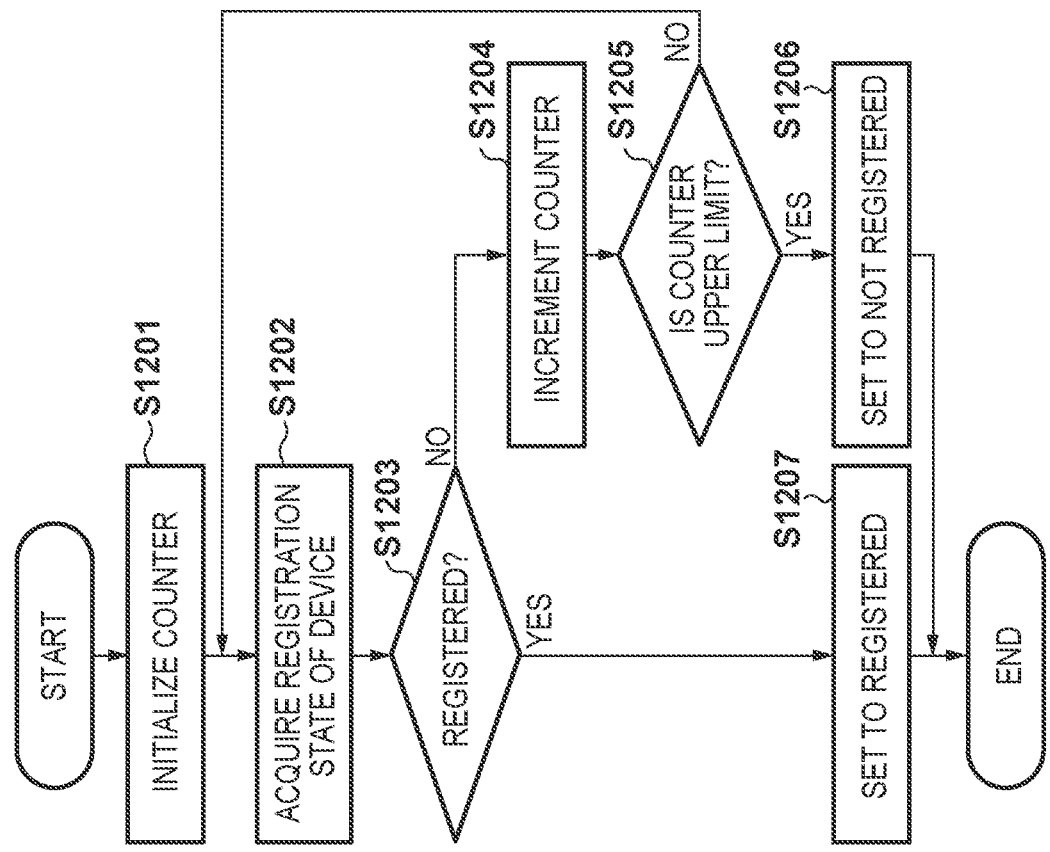

MONITORING APPARATUS AND CONTROL METHOD THEREOF

BACKGROUND OF THE INVENTION

Field of the Invention

The present invention relates to a monitoring apparatus and a control method thereof.

Description of the Related Art

A technology referred to as "Internet of Things (IoT)" that provides services with high additional value by utilizing information from various devices connected to a server via a network has been realized. IoT may include two systems. One of the systems is a device management system that provides a device management service for managing devices connected to the system, a storage service for managing collected information regarding devices, an authorization service that has an authorization function for connecting a device to a cloud service in a secure manner, and the like. The other is a contract service providing system that provides various services such as a device maintenance service and a reporting service in cooperation with the device management system. Japanese Patent Laid-Open No. 2017-126191 suggests a system in which a device that has a self-registration function performs registration processing in place of another device that has a self-registration function, and hands over an obtained authority. A monitoring apparatus registers a device that is a monitoring target, to an authorization server. The device registered in the authorization server may be changed to "not registered" independently from processing that is performed by a monitoring server. When a device that is not registered is managed by the monitoring apparatus as "registered", the monitoring apparatus cannot monitor such a device correctly.

SUMMARY OF THE INVENTION

An aspect of the present disclosure provides a technique for a management apparatus to correctly recognize the registration state of a device. According to some embodiments, a monitoring apparatus for monitoring a device, the monitoring apparatus comprising: a first management unit configured to manage a device that is a management target to be monitored, based on a list obtained from a management system that includes an authorization service for performing authorization processing; an obtaining unit configured to periodically obtain, from the device that is a management target, a state of registration of the device to the management system, the state being managed by the device; a specifying unit configured to specify the device that is a management target, as an unmatched device in a case where the state of registration obtained from the device indicates that the device is not registered; a registration processing unit configured to instruct the unmatched device to transmit, to the authorization service, a request to register the unmatched device to the management system; and a second management unit configured to manage whether the state of registration of the unmatched device has changed to indicate that the device is registered, by the obtaining unit obtaining the state of registration from the device that is a management target once or more after the instruction to transmit the request has been given is provided.

Further features of the present invention will become apparent from the following description of exemplary embodiments with reference to the attached drawings.

BRIEF DESCRIPTION OF THE DRAWINGS

FIG. 5 is a block diagram for illustrating an exemplary software configuration of a monitoring apparatus according to the first embodiment.

FIG. 6 is a diagram for illustrating information that is managed by a device management server according to the first embodiment.

FIG. 7 is a diagram for illustrating information that is managed by a monitoring apparatus according to the first embodiment.

FIG. 8 is a diagram for illustrating information that is managed by an authorization server according to the first embodiment.

FIG. 12 is a flowchart for illustrating an example of processing for confirming a registration state according to the first embodiment.

FIG. 13 is a sequence diagram for illustrating an example of processing for confirming proxy settings according to a second embodiment.

DESCRIPTION OF THE EMBODIMENTS

Figure 1:
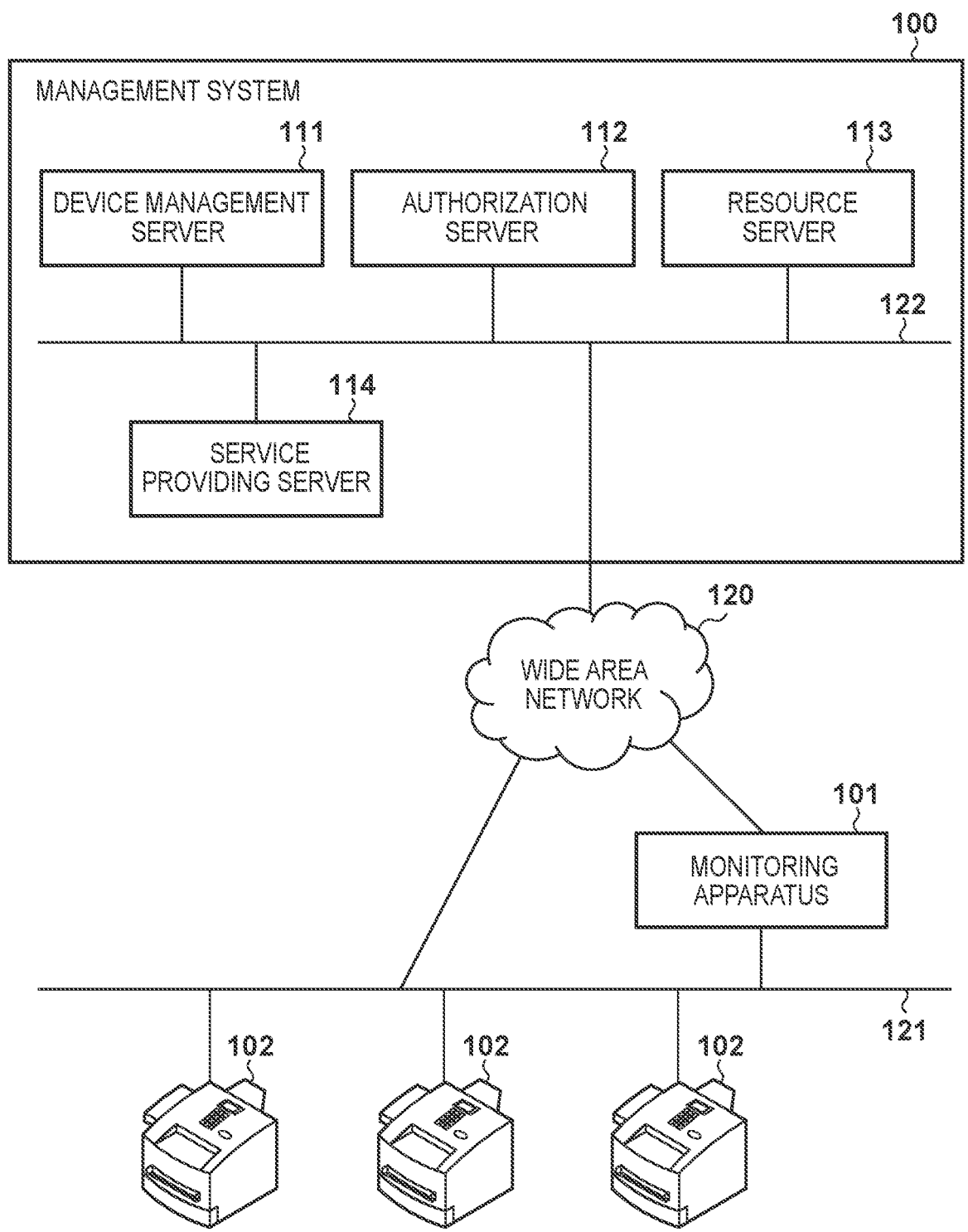
FIG. 1 is a block diagram for illustrating an exemplary network configuration that includes a management system according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment

Network Configuration

An exemplary network configuration that includes a management system 100 according to a first embodiment will be described with reference to FIG. 1. The management system 100 manages one or more devices. In the first embodiment, image forming apparatuses 102 are handled as examples of such devices that are managed by the management system 100. The management system 100 may manage other devices such as home electrical appliances, lighting equipment, air-conditioning equipment, and sensors, in place of or in addition to the image forming apparatuses 102. When the management system 100 manages a device other than the image forming apparatuses 102, each image forming apparatus 102 in the following description is replaced with the device. FIG. 1 shows three image forming apparatuses 102 connected to the same local area network (LAN) 121, as the devices that are managed by the management system 100. Alternatively, the management system 100 may manage another number of devices, or may manage devices separately connected to a plurality of LANs.

The management system 100 includes a device management server 111, an authorization server 112, a resource server 113, and a service providing server 114. The servers may be realized by providing, as services, functions of the servers operating as application servers on one or more server computers. In addition, the servers may operate as application servers on a virtual machine that uses hardware resources on one or more computers. In addition, alternatively, the management system 100 may be regarded as being constituted by only some of these constituent elements, and may include another constituent element.

A monitoring apparatus 101 is connected to the same LAN 121 as that connected to the image forming apparatuses 102 that are management targets. The management system 100 is connected to a network 122 that is different from the LAN 121. The monitoring apparatus 101 can communicate with a server (the device management server 111 and the like) within the management system 100, via a wide area network 120 such as the Internet.

Alternatively, at least one of the plurality of servers in the management system 100 may be connected to the LAN 121. The plurality of servers in the management system 100 may be disposed separately in a plurality of LANs. At least one of the plurality of servers in the management system 100 may be disposed on a cloud.

The monitoring apparatus 101 monitors the image forming apparatuses 102 that are management targets. The monitoring apparatus 101 collects information from the image forming apparatuses 102, for example. The servers in the management system 100 manage information collected by the monitoring apparatus 101 and the image forming apparatuses 102 that are management targets, and provide various services. The device management server 111 manages information regarding the monitoring apparatus 101 and the image forming apparatuses 102.

The authorization server 112 provides an authorization service for safely connecting the monitoring apparatus 101 and the image forming apparatuses 102 to another server within the management system 100. In the authorization service, authorization processing is performed. The authorization server 112 may provide the authorization service using the OAuth mechanism. The authorization server 112 registers the monitoring apparatus 101 and the image forming apparatuses 102 to itself, as clients associated with specific tenants. Each tenant refers to unitary management allocated to a customer that has signed a service use contract and is to be managed. The authorization server 112 manages data for each tenant. The authorization server 112 issues a token for clients thereof. By using the token, the monitoring apparatus 101 and the image forming apparatuses 102 can use a service provided by a server other than the authorization server 112. The authorization server 112 may further provide an authentication function. The authorization server 112 that provides the authentication function may be referred to as an "authentication authorization server".

The resource server 113 manages information collected from the image forming apparatuses 102. Information that is managed by the resource server 113 may be used for providing a service. The service providing server 114 provides services such as a maintenance service and a reporting service, using the information regarding the image forming apparatuses 102 managed by the resource server 113. The service providing server 114 may provide, to the user, a web user interface (UI) for setting information regarding the monitoring apparatus 101 and the image forming apparatuses 102 that are management targets.

Hardware Configuration of Image Forming Apparatus

An exemplary hardware configuration of an image forming apparatus 102 will be described with reference to FIG. 2. The image forming apparatus 102 may include the constituent elements shown in FIG. 2. The image forming apparatus 102 does not need to include some of the constituent elements shown in FIG. 2, and may include a constituent element that is not shown in FIG. 2.

A central processing unit (CPU) 201 performs overall control of devices connected to a system bus 206 by executing software stored in a read only memory (ROM) 202 or a hard disk drive (HDD) 205. A random access memory (RAM) 203 functions as a work area of the CPU 201 or the like. A hard disk controller (HDC) 204 controls writing/reading of data to/from the HDD 205.

A reader interface (I/F) 207 is connected to a reader unit 212. The reader I/F 207 controls the reader unit 212. A printer I/F 208 is connected to a printer unit 213. The printer I/F 208 controls the printer unit 213. An operation I/F 209 is connected to an operation unit 214. The operation I/F 209 controls display on the operation unit 214 and user input through the operation unit 214. The operation unit 214 is constituted by buttons for performing operations and a display unit, for example. A switch I/F 210 is connected to a switch unit 215. The switch I/F 210 controls operations performed through the switch unit 215. The switch unit 215 is constituted by a switch for performing an operation and the like. A network I/F 211 transmits/receives data from/to an external apparatus such as a host computer via the LAN 121.

Figure 2:
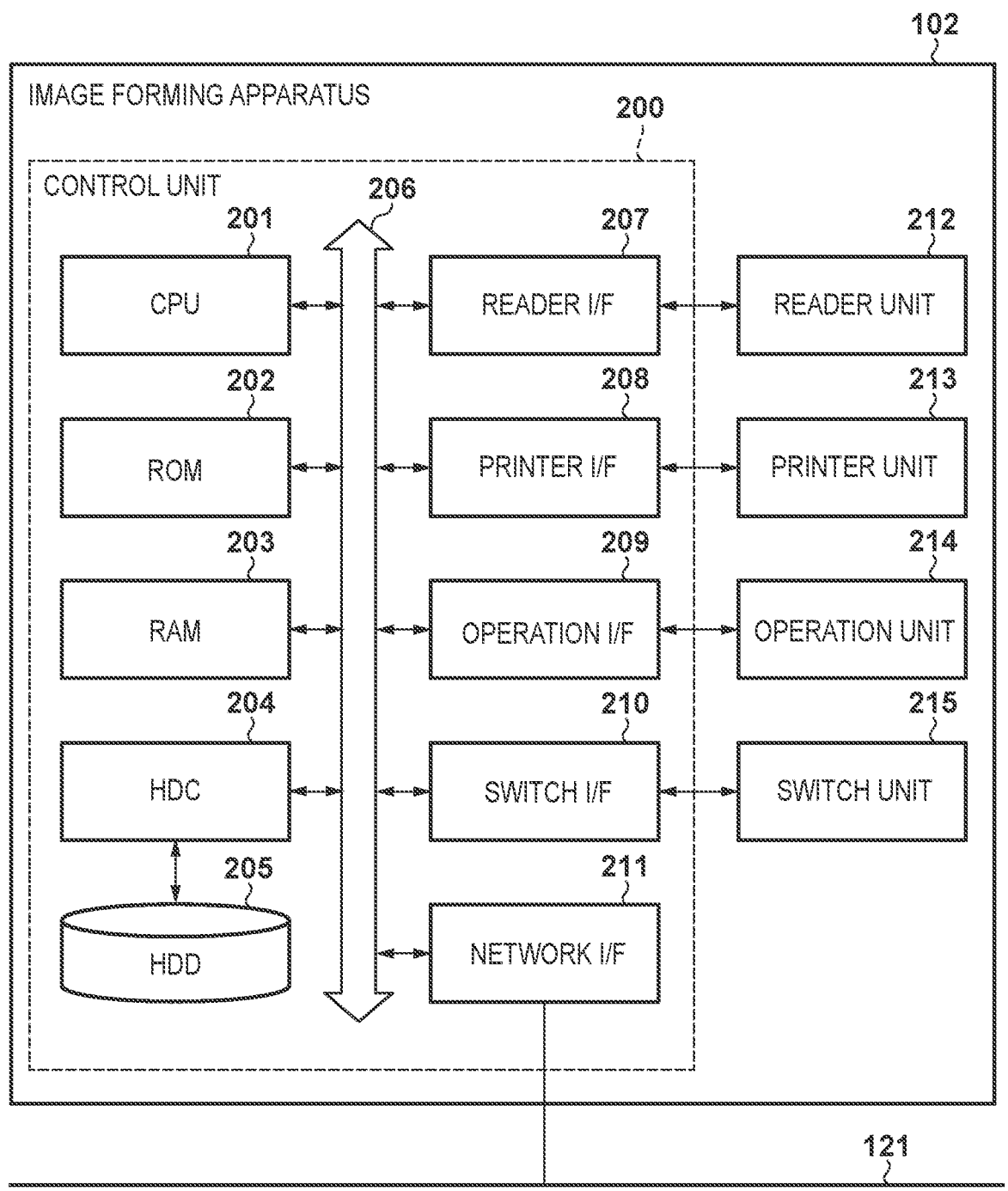
FIG. 2 is a block diagram for illustrating an exemplary hardware configuration of an image forming apparatus according to the first embodiment.

In FIG. 2, a portion surrounded by a broken line represents a control unit 200. The control unit 200 controls various apparatuses and interfaces connected to the image forming apparatus 102, and performs overall control of the image forming apparatus 102. The reader unit 212 reads an image of a document, and outputs image data indicating the image to the printer unit 213 in accordance with an instruction from the user, or stores the image data to the HDD 205. The reader unit 212 may transmit the image data to a host computer connected to the LAN 121 via the network I/F 211. The printer unit 213 prints a document read by the reader unit 212, and image data stored in the HDD 205. The printer unit 213 may receive, via the network I/F 211, a print job from the host computer connected to the LAN 121, and print the print job.

Hardware Configuration of Computer

Figure 3:
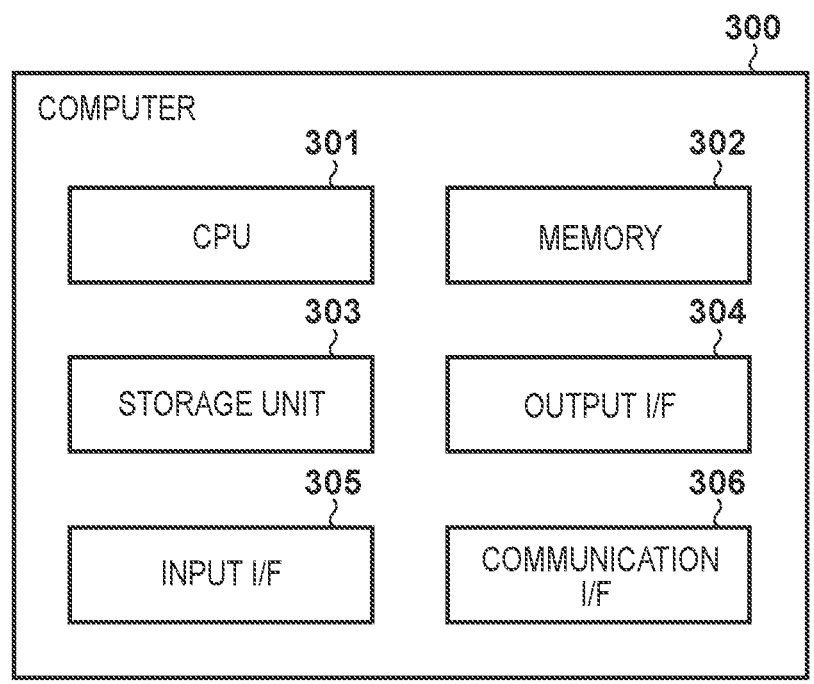
FIG. 3 is a block diagram for illustrating an exemplary hardware configuration of a computer according to the first embodiment.

An exemplary hardware configuration of a computer 300 will be described with reference to FIG. 3. The computer 300 may include the constituent elements shown in FIG. 3. The computer 300 does not need to include some of the constituent elements shown in FIG. 3, and may include a constituent element that is not shown in FIG. 3. The computer 300 may be used as any of the monitoring apparatus 101 and the servers in the management system 100 (for example, the device management server 111).

A CPU 301 reads out a program from a storage unit 303 to a memory 302, and executes this program. The CPU 301 is an example of a general-purpose processor. The memory 302 may be constituted by a RAM, for example. The storage unit 303 stores an operating system (OS), an application programs, data, and the like. The storage unit 303 may be constituted by an HDD, for example. An output I/F 304 is an interface for connecting an output device such as a display to the computer 300. The output I/F 304 outputs a result of executing a program and the like, to the output device. An input I/F 305 is an interface for connecting input devices such as a keyboard and a pointing device to the computer 300. The input I/F 305 obtains operation input of the user from through an input device. A communication I/F 306 is a network interface for performing communication with an external system or apparatus.

Software Configuration of Image Forming Apparatus

Figure 4:
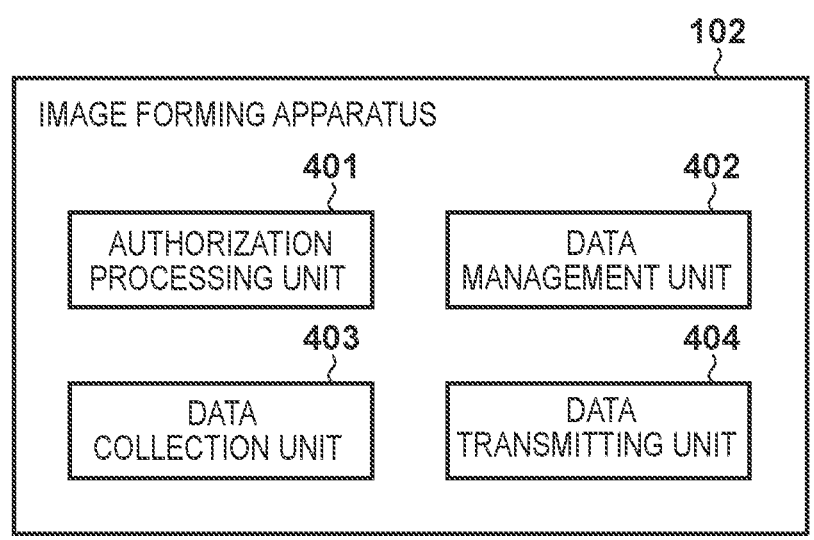
FIG. 4 is a block diagram for illustrating an exemplary software configuration of the image forming apparatus according to the first embodiment.

An exemplary software configuration of an image forming apparatus 102 will be described with reference to FIG. 4. The image forming apparatus 102 may include the constituent elements shown in FIG. 4. The image forming apparatus 102 does not need to include some of the constituent elements shown in FIG. 4, and may include a constituent element that is not shown in FIG. 4. The constituent elements of the image forming apparatus 102 may be realized by the CPU 201 of the image forming apparatus 102 executing a program loaded to the RAM 203, for example. The functions of the constituent elements of the image forming apparatus 102 will be described further in detail with reference to sequence diagrams and flowcharts to be described below.

An authorization processing unit 401 performs self-registration processing for registration to the authorization server 112, obtains and manages a token, and the like. The self-registration processing for registration to the authorization server 112 is processing for registering the apparatus to which the authorization processing unit 401 belongs (for example, the image forming apparatus 102) as a client to the authorization server 112. The self-registration processing may include transmitting, to the authorization server 112, a request to register the apparatus to which the authorization processing unit 401 belongs (for example, the image forming apparatus 102) to the authorization server 112. The authorization processing unit 401 may communicate with the monitoring apparatus 101 in order to perform settings used for monitoring the image forming apparatus 102.

A data management unit 402 manages data such as the settings of a proxy server. A data collection unit 403 collects data to be transmitted to the resource server 113, from a constituent element of the image forming apparatus 102. A data transmitting unit 404 transmits the data collected by the data collection unit 403 to the resource server 113.

Some of the plurality of image forming apparatuses 102 that are managed by the management system 100 do not need to include the authorization processing unit 401. An image forming apparatus 102 that does not include the authorization processing unit 401 cannot execute self-registration processing. For this reason, as will be described later, in place of the image forming apparatus 102, the monitoring apparatus 101 registers the image forming apparatus 102 to the authorization server 112.

Software Configuration of Monitoring Apparatus

An exemplary software configuration of the monitoring apparatus 101 will be described with reference to FIG. 5. The monitoring apparatus 101 may include the constituent elements shown in FIG. 5. The monitoring apparatus 101 does not need to include some of the constituent elements shown in FIG. 5, and may include a constituent element that is not shown in FIG. 5. The constituent elements of the monitoring apparatus 101 may be realized by the CPU 301 of the computer 300 that operates as the monitoring apparatus 101 executing a program loaded to the memory 302, for example. The functions of the constituent elements of the monitoring apparatus 101 will be described further in detail with reference to sequence diagrams and flowcharts to be described later.

A device management unit 501 manages the image forming apparatuses 102 that are managed by the management system 100. The device management unit 501 manages the image forming apparatuses 102 connected to the same LAN 121, for example. Specifically, the device management unit 501 may instruct each image forming apparatus 102 to perform setting of a proxy server, register the monitoring apparatus 101 and the image forming apparatus 102 to the authorization server 112, and manage a token issued by the authorization server 112.

A proxy unit 502 causes the monitoring apparatus 101 to operate as a proxy server. The proxy unit 502 may cause the monitoring apparatus 101 to operate as a proxy server for each image forming apparatus 102, for example. Accordingly, communication performed from the image forming apparatus 102 is collected in the monitoring apparatus 101. Instead of causing the monitoring apparatus 101 to operates as a proxy server, the proxy unit 502 may cause another apparatus connected to the LAN 121 to operate as a proxy server. In this case, the proxy unit 502 may obtain communication data between a server in the management system 100 and the image forming apparatus 102, from the other apparatus that operates as a proxy server. A multi-stage proxy may be configured by another proxy server being disposed on a communication path between a proxy server provided by the proxy unit 502 and the wide area network 120.

The monitoring apparatus 101 that operates as a proxy server receives data transmitted to an external apparatus (for example, a server in the management system 100) via the wide area network 120 by an image forming apparatus 102, and transmits the data to this external apparatus instead of the image forming apparatus 102. In addition, the monitoring apparatus 101 that operates as a proxy server receives data transmitted from an external apparatus to an image forming apparatus 102 via the wide area network 120, and transmits this data to the image forming apparatus 102.

A data management unit 503 manages information for monitoring the image forming apparatuses 102. This information may include status information indicating whether or not each image forming apparatus 102 is managed by the monitoring apparatus 101, for example. A task management unit 504 manages various tasks such as self-registration processing for registration of the monitoring apparatus 101 and monitoring and registration of the image forming apparatuses 102. A screen control unit 505 outputs a screen to an output device via the output I/F 304, and obtains input information from an input device via the input I/F 305. The screen control unit 505 supplies the obtained input information to a constituent element (for example, the data management unit 503) that processes this information.

Information that is Managed by Device Management Server

Information that is managed by the device management server 111 will be described with reference to FIG. 6. In the example in FIG. 6, the device management server 111 manages information in a table format. Alternatively, the device management server 111 may manage information in another format. The device management server 111 manages an agent management table 600 and a device management table 610. These tables may be stored in the storage unit 303 of the computer 300 that operates as the device management server 111.

The agent management table 600 is a table for managing information regarding the monitoring apparatus 101. The monitoring apparatus 101 can register the image forming apparatuses 102 to the authorization server 112 in place of the image forming apparatuses 102. For this reason, the monitoring apparatus 101 may also be referred to as an "agent". The agent management table 600 does not need to include some of the columns shown in FIG. 6, and may include a column that is not shown in FIG. 6. Similarly, another table to be described later does not need to include some of the illustrated columns, and may include a column that is not illustrated.

An agent ID 601 refers to information for uniquely identifying a monitoring apparatus 101 in the management system 100. The agent ID 601 may be allocated to the monitoring apparatus 101 by the device management server 111. A tenant ID 602 refers to information for uniquely identifying a tenant to which the monitoring apparatus 101 identified by the agent ID 601 belongs. The tenant ID 602 may be allocated to a tenant by a server (not illustrated) that manages the tenant.

A client ID 603 refers to information for uniquely identifying a client of the authorization server 112 in the management system 100. A client of the authorization server 112 refers to an entity that is registered in the authorization server 112. In the first embodiment, the monitoring apparatus 101 and the image forming apparatuses 102 can be clients of the authorization server 112. Each client ID 603 may be allocated to a client by the authorization server 112. A status 604 indicates whether the monitoring apparatus 101 is valid or invalid.

The device management table 610 is a table for managing information regarding the image forming apparatuses 102. A server provided device ID 611 refers to information for uniquely identifying each image forming apparatus 102, in the management system 100. The server provided device ID 611 may be allocated to the image forming apparatus 102 by the device management server 111. A serial number 612 is a number uniquely allocated to each image forming apparatus 102 by the manufacturer of the image forming apparatus 102. A tenant ID 613 refers to information for uniquely identifying a tenant to which the image forming apparatus 102 identified by the server provided device ID 611 belongs. The tenant ID 613 has the same code scheme as the tenant ID 602. An agent ID 614 refers to information for uniquely identifying the monitoring apparatus 101 associated with the image forming apparatus 102 identified by the server provided device ID 611. The agent ID 614 has the same code scheme as the agent ID 601. A status 615 indicates whether the image forming apparatus 102 is valid or invalid.

The device management server 111 may add a new record to the agent management table 600 and the device management table 610 in accordance with an instruction from the service providing server 114. The service providing server 114 may obtain information regarding the monitoring apparatus 101 and the image forming apparatuses 102 that are managed by the management system 100, from the user via a web user interface, or from another apparatus via a Web API.

Information that is Managed by Monitoring Apparatus

Information that is managed by the monitoring apparatus 101 will be described with reference to FIG. 7. In the example in FIG. 7, the monitoring apparatus 101 manages information in a table format. Alternatively, the monitoring apparatus 101 may manage information in another format. The monitoring apparatus 101 manages a device management table 700. This table may be stored in the storage unit 303 of the computer 300 that operates as the monitoring apparatus 101.

The device management table 700 is a table for managing information regarding the image forming apparatuses 102. Every time information regarding an image forming apparatus 102 is obtained, the monitoring apparatus 101 adds a new record to the device management table 700. Information regarding the image forming apparatuses 102 is obtained as a list of devices that are management targets, for example, from the device management server 111. The devices that are management targets are devices that are to be monitored by the monitoring apparatus 101.

A device ID 701 refers to information for uniquely identifying an image forming apparatus 102, in the monitoring apparatus 101. The device ID 701 may be allocated to the image forming apparatus 102 by the monitoring apparatus 101. A serial number 702 is a number uniquely allocated to each image forming apparatus 102 by the manufacturer of the image forming apparatus 102. An internet protocol (IP) address 703 is the IP address of the image forming apparatus 102 identified by the device ID 701.

A management state 704 indicates whether or not the image forming apparatus 102 identified the device ID 701 is managed by the management system 100. An image forming apparatus 102 for which the management state 704 is "targeted" is managed by the management system 100. Ab image forming apparatus 102 for which the management state 704 is "not targeted" is not managed by the management system 100.

A registration state 705 indicates whether or not the image forming apparatus 102 identified by the device ID 701 is registered in the authorization server 112. An image forming apparatus 102 for which the registration state 705 is "registered" is registered in the authorization server 112. An image forming apparatus 102 registered in the authorization server 112 may be regarded as an image forming apparatus 102 registered in the management system 100. An image forming apparatus 102 for which the registration state 705 is "not registered" is not registered in the authorization server 112. The image forming apparatus 102 for which the registration state 705 is "not registered" may have been registered in the authorization server 112 in the past, or may have never been registered to the authorization server 112.

A monitoring method 706 indicates a method for monitoring the image forming apparatus 102 identified by the device ID 701. An image forming apparatus 102 for which the monitoring method 706 is "proxy" is monitored by the monitoring apparatus 101 using a proxy method. The proxy method refers to a method in which the image forming apparatus 102 communicates with a server via a proxy server, and communication data transmitted or received by the image forming apparatus 102 via this proxy server is monitored by the monitoring apparatus 101. An image forming apparatus 102 for which the monitoring method 706 is "polling" is monitored by the monitoring apparatus 101 using a polling method. The polling method refers to a method in which the monitoring apparatus 101 monitors information obtained from the image forming apparatus 102 by the monitoring apparatus 101 by performing polling.

A server provided device ID 707 is a server provided device ID allocated by the image forming apparatus 102 identified by the device ID 701. The server provided device ID 707 has the same code scheme as the server provided device ID 611.

Information that is Managed by Authorization Server

Information that is managed by the authorization server 112 will be described with reference to FIG. 8. In the example in FIG. 8, the authorization server 112 manages information in a table format. Alternatively, the authorization server 112 may manage information in another format. The authorization server 112 manages an activation code management table 800, a registration key management table 810, a client management table 820, and a credential management table 830. These tables may be stored in the storage unit 303 of the computer 300 that operates as the authorization server 112.

The activation code management table 800 is a table for managing activation codes related to the image forming apparatuses 102. Every time an activation code is issued for an image forming apparatus 102, the authorization server 112 adds a new record to the activation code management table 800.

An activation code 801 is an activation code issued for an image forming apparatus 102 by the authorization server 112. An activation code may be issued for each image forming apparatus 102. A serial number 802 is a number uniquely allocated to an image forming apparatus 102 for which the activation code 801 has been issued, by the manufacturer of the image forming apparatus 102. A device registration key 803 is a device registration key used for issuing the activation code 801. An expiration date 804 is an expiration date set for the activation code 801.

The registration key management table 810 is a table for managing device registration keys. Every time a device registration key is issued, the authorization server 112 adds a new record to the registration key management table 810.

A device registration key 811 is a device registration key issued by the authorization server 112. A device registration key may be issued for each tenant. Alternatively, the device registration key may be issued for each image forming apparatus 102. A tenant ID 812 refers to information for uniquely identifying a tenant for which the device registration key 811 has been issued. The tenant ID 812 has the same code scheme as the tenant ID 602. An expiration date 813 is an expiration date set for the device registration key 811.

The client management table 820 is a table for managing information regarding clients, in other words the monitoring apparatus 101 and the image forming apparatuses 102. A client ID 821 refers to information for uniquely identifying a client of the authorization server 112, in the management system 100. When the client is the monitoring apparatus 101, the client ID 821 may be the agent ID of the monitoring apparatus 101. When the client is an image forming apparatus 102, the client ID 821 may be the server provided device ID of the image forming apparatus 102. The client ID 821 has the same code scheme as the client ID 603.

A serial number 822 is a number uniquely allocated to an image forming apparatus 102 by the manufacturer of the image forming apparatus 102. If the client is the monitoring apparatus 101, the serial number 822 may be blank. A tenant ID 823 refers to information for uniquely identifying a tenant to which the client identified by the client ID 821 belongs. The tenant ID 823 has the same code scheme as the tenant ID 602. A status 824 indicates whether the client is valid or invalid.

The authorization server 112 may add a new record to the client management table 820 in accordance with an instruction from the service providing server 114. The authorization server 112 may obtain information regarding the monitoring apparatus 101 and the image forming apparatuses 102 that are managed by the management system 100, from the user via the web user interface, or from another apparatus via a Web API.

The credential management table 830 is a table for managing credentials issued for the clients, in other words, the monitoring apparatus 101 and the image forming apparatuses 102. Every time a credential is issued, the authorization server 112 adds a new record to the credential management table 830.

A client ID 831 may be information for uniquely identifying a client of the authorization server 112, in the management system 100. The client ID 831 has the same code scheme as the client ID 821. A credential 832 is a credential (for example, a private key) issued for a client identified by the client ID 831. A credential may be issued for each client.

Processing for Reregistering Image Forming Apparatus

Figure 9:
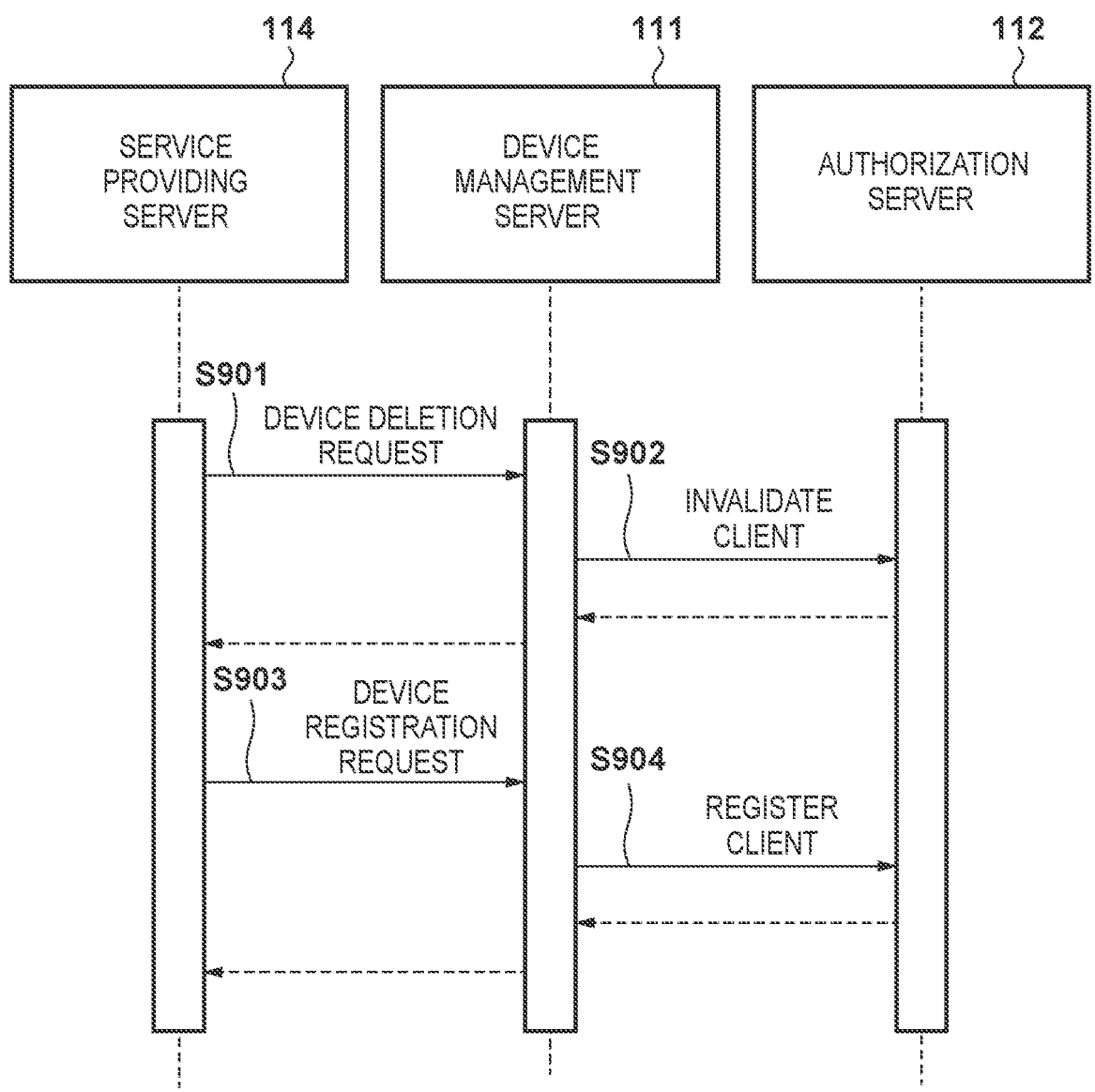
FIG. 9 is a sequence diagram for illustrating an example of processing for reregistering an image forming apparatus according to the first embodiment.

Processing for reregistering an image forming apparatus 102 that is performed by the device management server 111 will be described with reference to FIG. 9. Assume that, at a time point when the processing in FIG. 9 is started, one or more image forming apparatuses 102 are managed using the device management table 610 of the device management server 111. In the device management server 111, all of the statuses 615 of the one or more image forming apparatuses 102 are "valid". In addition, assume that, at a time point when the processing in FIG. 9 is started, the one or more image forming apparatuses 102 are managed using the client management table 820 of the authorization server 112. Assume that, in the client management table 820, all of the statuses 824 of the one or more image forming apparatuses 102 are valid.

In step S901, the service providing server 114 transmits a request to delete a specific image forming apparatus 102, to the device management server 111. This request may be accompanied by the server provided device ID of the image forming apparatus 102. The service providing server 114 may transmit this request in accordance with an instruction obtained from the user of the management system 100 (for example, a maintenance worker) via a Web UI, for example, or may transmit this request in accordance with an instruction obtained from another server via a Web API. Receiving this request, the device management server 111 changes the status 615 of this image forming apparatus 102 in the device management table 610 to "invalid".

In step S902, the device management server 111 transmits a request to invalidate the deleted image forming apparatus 102, to the authorization server 112. This request may be accompanied by the server provided device ID obtained in step S901. Receiving this request, the authorization server 112 changes the status 824 of this image forming apparatus 102 in the client management table 820 to "invalid".

In step S903, the service providing server 114 transmits a request to register the deleted image forming apparatus 102 again, to the device management server 111. This request may be accompanied by the serial number of the image forming apparatus 102. The service providing server 114 may transmit this request in accordance with an instruction obtained from the user of the management system 100 (for example, a maintenance worker) via a Web UI, for example, or may transmit this request in accordance with an instruction obtained from another server via a Web API. Receiving this request, the device management server 111 changes the status 615 of this image forming apparatus 102 in the device management table 610 to "valid".

In step S904, the device management server 111 transmits a request to register the registered image forming apparatus 102, to the authorization server 112. This request may be accompanied by the serial number obtained in steps S903. Receiving this request, the authorization server 112 registers the image forming apparatus 102 identified by the serial number obtained in step S903. Even when this request is received, the authorization server 112 maintains the status 824 of this image forming apparatus 102 in the client management table 820 as "invalid".

The image forming apparatus 102 holds a token issued by the authorization server 112. When the expiration date of the token held by the image forming apparatus 102 expires, the image forming apparatus 102 requests a new token from the authorization server 112. When a token is requested by the image forming apparatus 102 for which the status 824 is invalid, the authorization server 112 notifies the image forming apparatus 102 that the image forming apparatus 102 is invalid, by returning an invalid client error as a response. Accordingly, the image forming apparatus 102 manages the registration state of itself, as a state of not being registered in the authorization server 112 (not registered). After that, the image forming apparatus 102 does not perform any operation that uses a token, such as an operation of providing information to the resource server 113.

The monitoring apparatus 101 periodically requests a list of the image forming apparatuses 102 that are monitoring targets, from the device management server 111. The device management server 111 transmits, to the monitoring apparatus 101, a list of the image forming apparatuses 102 for which the status 615 in the device management table 610 is valid. The monitoring apparatus 101 registers, to the authorization server 112, the image forming apparatuses 102 included in the list obtained from the device management server 111. The monitoring apparatus 101 manages each image forming apparatus 102 registered in the authorization server 112 as being "registered" as the registration state 705 in the device management table 700, and monitors this image forming apparatus 102. However, even the image forming apparatus 102 managed as being "registered" in the registration state 705 in the device management table 700 can be in a state of not being registered in the authorization server 112, as described above. In such a case, the monitoring apparatus 101 cannot appropriately monitor the image forming apparatus 102. In view of this, in the first embodiment, the monitoring apparatus 101 periodically obtains the registration states of the image forming apparatus 102 from the image forming apparatus 102.

Processing for Updating Registration State of Image Forming Apparatus

Figure 10:
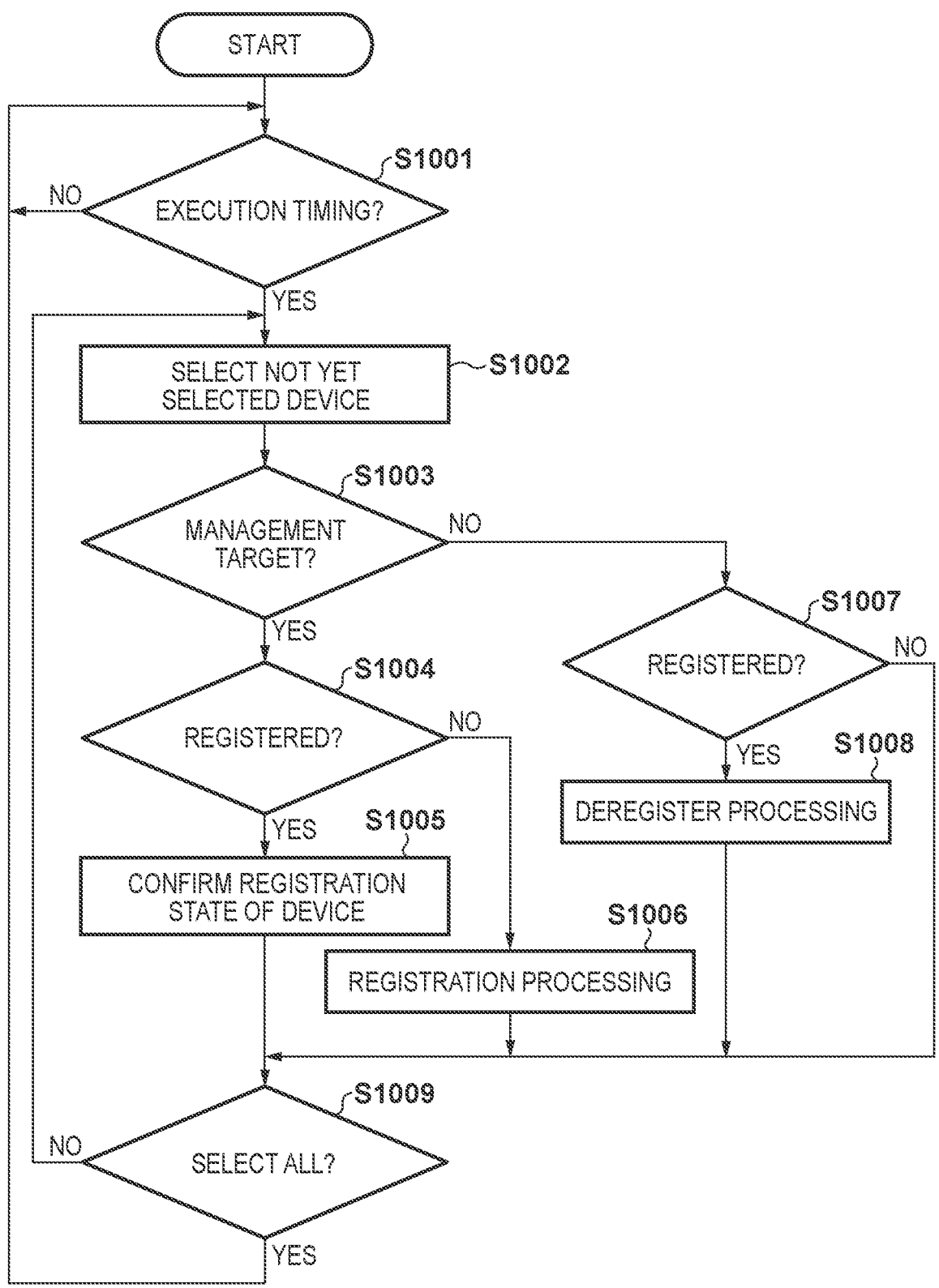
FIG. 10 is a sequence diagram for illustrating an example of processing for updating the registration state of an image forming apparatus according to the first embodiment.

Processing in which the monitoring apparatus 101 updates the registration state of an image forming apparatus 102 will be described with reference to FIG. 10. In step S1001, the task management unit 504 of the monitoring apparatus 101 determines whether or not it is timing for updating the registration state of the image forming apparatus 102. If it is determined that it is timing for updating the registration state of the image forming apparatus 102 ("YES" in step S1001), the task management unit 504 advances the procedure to step S1002, otherwise ("NO" in step S1001) the task management unit 504 repeats step S1001. Accordingly, the task management unit 504 periodically executes the processing of step S1002 onward.

In step S1002, the task management unit 504 of the monitoring apparatus 101 selects one image forming apparatus 102 that has not been selected, from the device management table 700. The task management unit 504 executes the processing of steps S1003 to S1008 on the selected image forming apparatus 102.

In step S1003, the task management unit 504 of the monitoring apparatus 101 determines whether or not the selected image forming apparatus 102 is a management target. If it is determined that the selected image forming apparatus 102 is a management target ("YES" in step S1003), the task management unit 504 advances the procedure to step S1004, otherwise ("NO" in step S1003) the task management unit 504 advances the procedure to step S1007. When the management state 704 in the device management table 700 is "targeted", the task management unit 504 may determine that the image forming apparatus 102 is a management target.

In step S1004, the task management unit 504 of the monitoring apparatus 101 determines whether or not the selected image forming apparatus 102 is managed as being "registered" in the authorization server 112. If it is determined that the selected image forming apparatus 102 is managed as being "registered" ("YES" in step S1004), the task management unit 504 advances the procedure to step S1005, otherwise ("NO" in step S1004) the task management unit 504 advances the procedure to step S1006. When the registration state 705 in the device management table 700 is "registered", the task management unit 504 may determine that the image forming apparatus 102 is managed as being "registered" in the authorization server 112.

Step S1005 is executed when the image forming apparatus 102 is a management target and is managed as being "registered". As described above, even when the image forming apparatus 102 is managed as being "registered" by the monitoring apparatus 101, there is the possibility that the image forming apparatus 102 is not registered in the authorization server 112. In view of this, the task management unit 504 of the monitoring apparatus 101 obtains the registration state of the image forming apparatus 102 from the image forming apparatus 102, and registers the image forming apparatus 102 to the authorization server 112 if the image forming apparatus 102 is not registered. Specifically, the task management unit 504 executes steps S1101 to S1121 to be described later with reference to FIG. 11.

Step S1006 is executed when the image forming apparatus 102 is a management target and is managed as being "not registered". In order for the image forming apparatus 102 to use a service of the resource server 113, the image forming apparatus 102 needs to be registered in the authorization server 112. In view of this, the task management unit 504 of the monitoring apparatus 101 registers the image forming apparatus 102 to the authorization server 112. Specifically, the task management unit 504 executes steps S1103 to S1121 to be described later with reference to FIG. 11.

In step S1007, the task management unit 504 of the monitoring apparatus 101 determines whether or not the selected image forming apparatus 102 is managed as "registered" by the authorization server 112. If it is determined that the selected image forming apparatus 102 is managed as "registered" ("YES" in step S1007), the task management unit 504 advances the procedure to step S1008, otherwise ("NO" in step S1007) the task management unit 504 advances the procedure to step S1009. If the registration state 705 of the device management table 700 is "registered", the task management unit 504 may determine that the image forming apparatus 102 is managed as "registered" by the authorization server 112.

Step S1008 is executed when the image forming apparatus 102 is not a management target and is managed as "registered". Since the image forming apparatus 102 is not a management target, the image forming apparatus 102 does not need to be registered in the authorization server 112. In view of this, the device management unit 501 of the monitoring apparatus 101 instructs the image forming apparatus 102 to transmit, to the authorization server 112, a request to cancel registration of the image forming apparatus 102. The authorization processing unit 401 of the image forming apparatus 102 transmits a request to cancel registration of the image forming apparatus 102, to the authorization server 112 in accordance with this instruction. In addition, the device management unit 501 sets the registration state 705 of this image forming apparatus 102 in the device management table 700 to "not registered".

In step S1009, the task management unit 504 of the monitoring apparatus 101 determines whether or not all of the image forming apparatuses 102 included in the device management table 700 have been selected. If it is determined that all of the image forming apparatuses 102 have been selected ("YES" in step S1009), the task management unit 504 advances the procedure to step S1001, otherwise ("NO" in step S1009) the task management unit 504 advances the procedure to step S1002. After the procedure is advanced to step S1001, the task management unit 504 waits until the next update timing.

Processing for Registering Image Forming Apparatus

Figure 11:
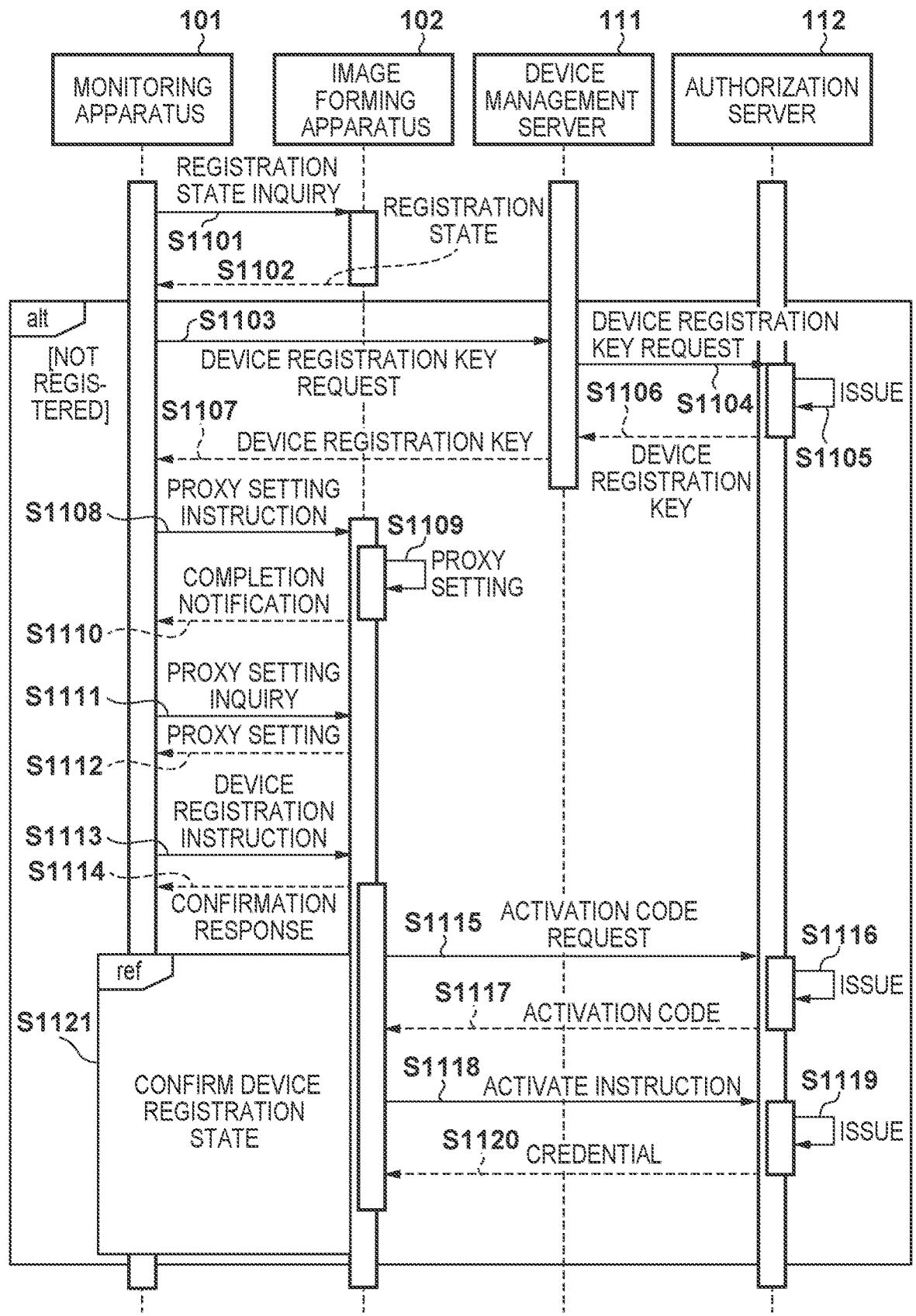
FIG. 11 is a sequence diagram for illustrating an example of processing for registering an image forming apparatus according to the first embodiment.

Processing that is executed in step S1005 in FIG. 10 will be described in detail with reference to FIG. 11. In step S1101, the device management unit 501 of the monitoring apparatus 101 inquires of the authorization processing unit 401 of the image forming apparatus 102, about the state of registration to the authorization server 112. In step S1102, in response to this inquiry, the authorization processing unit 401 of the image forming apparatus 102 notifies the monitoring apparatus 101 of the registration state of the image forming apparatus 102 itself, that is to say whether or not the image forming apparatus 102 is registered in the authorization server 112. The authorization processing unit 401 of the image forming apparatus 102 stores the state of registration to the authorization server 112, to the RAM 203, for example. When the image forming apparatus 102 is already registered in the authorization server 112, the monitoring apparatus 101 ends the processing/procedure. When the image forming apparatus 102 is not registered in the authorization server 112, the monitoring apparatus 101 executes the processing of step S1103 onward.

As described above, the processing of steps S1101 and S1102 is executed if it is determined in step S1001 that it is timing for updating the registration state of the image forming apparatus 102. For this reason, the processing of steps S1101 and S1102 is also periodically executed. In addition, the processing of steps S1101 and S1102 is executed when the image forming apparatus 102 is managed as "registered" in the authorization server 112, by the monitoring apparatus 101. When the registration state of the image forming apparatus 102 obtained in step S1102 is "not registered", the registration state that is managed by the monitoring apparatus 101 (i.e., "registered") and the registration state obtained from the image forming apparatus 102 (i.e., "not registered") do not match. For this reason, the monitoring apparatus 101 specifies such an image forming apparatus 102 as a mismatch device. The monitoring apparatus 101 executes the processing of steps S1103 to S1121 for the mismatch device.

Processing that is executed for an image forming apparatus 102 that is monitored using the proxy method in steps S1103 to S1121 will be described. An image forming apparatus 102 that is monitored using the polling method may be registered to the authorization server 112 using another method.

In step S1103, the device management unit 501 of the monitoring apparatus 101 requests a device registration key from the device management server 111. This request may be accompanied by the server provided device ID of the image forming apparatus 102 that is a registration target, and a token. The device management unit 501 may use the server provided device ID 707 in the device management table 700, as this server provided device ID. The token may be obtained from the authorization server 112 in advance and stored in the memory 302.

In step S1104, the device management server 111 examines the validity of the token received from the monitoring apparatus 101. After the token has been verified successfully, the device management server 111 determines whether or not a record that includes the server provided device ID 611 that matches the server provided device ID received from the monitoring apparatus 101 is included in the device management table 610. Such a record being included in the device management table 610 means that the image forming apparatus 102 that is a registration target is managed by the device management server 111. When the image forming apparatus 102 that is a registration target is managed by the device management server 111, the device management server 111 requests a device registration key from the device management server 111. This request may be accompanied by the server provided device ID obtained in step S1103.

In step S1105, the authorization server 112 determines whether or not a record that includes the client ID 821 that matches the server provided device ID received in step S1104 is included in the client management table 820. Such a record being included in the client management table 820 means that the image forming apparatus 102 that is a registration target is managed by the authorization server 112. When the image forming apparatus 102 that is a registration target is managed by the authorization server 112, the authorization server 112 issues a device registration key. The authorization server 112 adds a new record to the registration key management table 810. The authorization server 112 sets the issued device registration key as the device registration key 811 of the new record. The authorization server 112 sets the tenant ID 823 of the client management table 820, as the tenant ID 812 of new record. The authorization server 112 sets the expiration date 813 of the new record in accordance with a rule set in advance.

In step S1106, the authorization server 112 transmits the device registration key issued in step S1105 to the device management server 111. In step S1107, the device management server 111 transmits the device management key received in step S1106 to the monitoring apparatus 101.

In step S1108, the device management unit 501 of the monitoring apparatus 101 instructs the image forming apparatus 102 to use a designated proxy server. This instruction may be accompanied by information regarding the proxy server. The information regarding the proxy server may include an IP address and a port number. The information regarding the proxy server may be an IP address and a port number obtained from the user. The monitoring apparatus 101 may operate as a proxy server that includes the IP address and port number. Alternatively, the monitoring apparatus 101 may transmit information regarding a proxy server other than the monitoring apparatus 101 to the image forming apparatus 102. In this case, the monitoring apparatus 101 may obtain communication data of the image forming apparatus 102 from this proxy server.

In step S1109, the data management unit 402 of the image forming apparatus 102 sets the information regarding the proxy server received in step S1108. The image forming apparatus 102 then starts to use the set proxy server. For this reason, communication between the image forming apparatus 102 and the wide area network 120 is performed via the set proxy server. In step S1110, the data management unit 402 of the image forming apparatus 102 notifies the monitoring apparatus 101 that the setting of the proxy server has been completed.

In step S1111, the device management unit 501 of the monitoring apparatus 101 inquires of the authorization processing unit 401 of the image forming apparatus 102 about the information regarding the proxy server set in the image forming apparatus 102. In step S1112, the authorization processing unit 401 of the image forming apparatus 102 transmits the set information regarding the proxy server to the monitoring apparatus 101. The data management unit 503 of the monitoring apparatus 101 stores the received information regarding the proxy server.

In step S1113, the device management unit 501 of the monitoring apparatus 101 instructs the image forming apparatus 102 to transmit, to the authorization server 112, a request to register the image forming apparatus 102 to the authorization server 112. This instruction may be accompanied by the device registration key obtained in step S1107. In step S1114, the image forming apparatus 102 transmits a confirmation response to the monitoring apparatus 101.

In step S1115, the authorization processing unit 401 of the image forming apparatus 102 requests an activation code from the authorization server 112. This request may be accompanied by the device registration key obtained in step S1113, and the serial number of the image forming apparatus 102. The serial number of the image forming apparatus 102 is stored in the ROM 202, for example.

In step S1116, the authorization server 112 references the registration key management table 810, and specifies a record that includes the device registration key 811 that matches the device registration key obtained in step S1115. The authorization server 112 confirms the validity of the device registration key based on the expiration date 813 of this record. If the device registration key is valid, the authorization server 112 issues an activation code. The authorization server 112 adds a new record to the activation code management table 800. The authorization server 112 sets the issued activation code as the activation code 801 of the new record. The authorization server 112 sets the serial number obtained in step S1115, as the serial number 802 of the new record. The authorization server 112 sets the device registration key obtained in step S1115, as the device registration key 803 of the new record. The authorization server 112 sets the expiration date 804 of the new record in accordance with a rule set in advance.

In step S1117, the authorization server 112 transmits the activation code to the image forming apparatus 102. When such a record cannot be specified, or the device registration key is invalid, the authorization server 112 may transmit an error to the image forming apparatus 102.

In step S1118, receiving the activation code, the authorization processing unit 401 of the image forming apparatus 102 requests that the authorization server 112 activate the image forming apparatus 102. This request may be accompanied by the activation code obtained in step S1117, the device registration key obtained in step S1113, and the serial number of the image forming apparatus 102. The serial number of the image forming apparatus 102 is stored in the ROM 202, for example.

In step S1119, the authorization server 112 references the activation code management table 800, and specifies a record that includes the activation code 801, the serial number 802, and the device registration key 803 that respectively match the activation code, the serial number, and the device registration key obtained in step S1118. If such a record can be specified, the authorization server 112 confirms the validity of the activation code 801 based on the expiration date 804 of this record. The authorization server 112 issues a credential if the activation code 801 is valid. In addition, the authorization server 112 adds a new record to the credential management table 830. The authorization server 112 sets the serial number obtained in step S1118 as the client ID 831, and sets the issued credential as the credential 832.

In step S1120, the authorization server 112 transmits the issued credential to the image forming apparatus 102. The authorization server 112 may transmit an error to the image forming apparatus 102 when a record cannot be specified in step S1119 or the activation code 801 is invalid.

The authorization server 112 may regard a client that includes a credential 832 that is managed using the credential management table 830, as a client registered thereto. For this reason, the request (request for activation) transmitted by the image forming apparatus 102 in step S1118 may be regarded as a request to register the image forming apparatus 102 to the authorization server 112.

In step S1121, the monitoring apparatus 101 may confirm the registration state of the image forming apparatus 102 in accordance with the confirmation response received in step S1114. This processing will be described later in detail. In an embodiment in which the confirmation response in step S1114 is omitted, the monitoring apparatus 101 may execute the processing of step S1121 in accordance with transmitting of the instruction in step S1113.

Processing for Confirming Registration State

Processing for confirming a registration state that is executed in step S1121 in FIG. 11 will be described in detail with reference to FIG. 12. In step S1201, the device management unit 501 of the monitoring apparatus 101 initializes a counter to 0. This counter counts the number of times processing for confirming the registration state has been attempted.

In step S1202, the device management unit 501 of the monitoring apparatus 101 obtains the state of registration of an image forming apparatus 102 to the authorization server 112. The device management unit 501 inquires of the authorization processing unit 401 of the image forming apparatus 102 about the registration state, for example. In response to this inquiry, the device management unit 501 obtains the state of registration of the image forming apparatus 102 to the authorization server 112.

In step S1203, the device management unit 501 of the monitoring apparatus 101 determines whether or not the registration state of the image forming apparatus 102 is "registered". If it is determined that the registration state is "registered" ("YES" in step S1203), the device management unit 501 advances the procedure to step S1207, otherwise, that is to say, if it is determined that the registration state is "not registered" ("NO" in step S1203), the device management unit 501 advances the procedure to step S1204. In step S1207, the device management unit 501 of the monitoring apparatus 101 sets the registration state 705 of the target record in the device management table 700 to "registered".

When the registration state 705 is already "registered", the device management unit 501 maintains the registration state 705 as "registered". Accordingly, it is possible to confirm and manage a change in the registration state of the image forming apparatus 102.

In step S1204, the device management unit 501 of the monitoring apparatus 101 increments the counter by 1. In step S1205, the device management unit 501 determines whether or not the counter has reached a predetermined number of times. If it is determined that the counter has reached the predetermined number of times ("YES" in step S1205), the device management unit 501 advances the procedure to step S1206, otherwise ("NO" in step S1205) the device management unit 501 advances the procedure to step S1202. The predetermined number of times of the counter may be set in advance, and stored in the monitoring apparatus 101. In this manner, the device management unit 501 repeatedly obtains the registration state managed by the image forming apparatus 102, from the image forming apparatus 102 one or more times.

In step S1206, the device management unit 501 of the monitoring apparatus 101 sets the registration state 705 of the target record in the device management table 700 to "not registered". Accordingly, the image forming apparatus 102 is managed by the monitoring apparatus 101 as a device that is not registered.

According to the first embodiment, the monitoring apparatus 101 periodically obtains the registration state of the image forming apparatus 102. Accordingly, the monitoring apparatus 101 can correctly recognize the registration state of the image forming apparatus 102. Furthermore, by registering an image forming apparatus 102 that is not registered, to the authorization server, the monitoring apparatus 101 can continue to normally monitor the image forming apparatus 102.

Second Embodiment

A management system 100 according to a second embodiment will be described with reference to FIG. 13. The second embodiment is different from the first embodiment in that a proxy server is reset. Items for which description is omitted in the second embodiment may be similar to those in the first embodiment.

An image forming apparatus 102 that is monitored using a proxy method cannot communicate with a server (for example, the resource server 113) in the management system 100 when the settings of the proxy server are not proper. When the user of the image forming apparatus 102 mistakenly updates the settings of the proxy server or an SRAM that stores the settings of the proxy server is cleared, for example, the settings of the proxy server of the image forming apparatus 102 may be different from those designated for the management system 100. In view of this, in the second embodiment, the monitoring apparatus 101 monitors the settings of the proxy server of the image forming apparatus 102.

Processing in which the monitoring apparatus 101 monitors the settings of the proxy server of the image forming apparatus 102 will be described with reference to FIG. 13. The processing in FIG. 13 may be executed for all of the image forming apparatuses 102 that are monitored using the proxy method. Furthermore, a configuration may also be adopted in which the processing in FIG. 13 is executed for an image forming apparatus 102 for which the processing of step S1005 in FIG. 10 is executed, and is not executed for the other image forming apparatuses 102.

In step S1301, the device management unit 501 of the monitoring apparatus 101 determines whether or not it is timing for confirming the settings of the proxy server of the image forming apparatus 102. If it is determined that it is timing for confirming the settings of the proxy server of the image forming apparatus 102 ("YES" in step S1301), the device management unit 501 advances the procedure to step S1302, otherwise ("NO" in step S1301) the device management unit 501 repeats step S1301. Accordingly, the task management unit 504 periodically executes the processing of step S1302 onward.

In step S1301, the device management unit 501 of the monitoring apparatus 101 obtains the settings of the proxy server (for example, an IP address and a port number) from the image forming apparatus 102.

In step S1303, the device management unit 501 of the monitoring apparatus 101 determines whether or not the proxy server set in the image forming apparatus 102 matches the proxy server designated in step S1108. If it is determined that the proxy servers match ("YES" in step S1303), the device management unit 501 advances the procedure to step S1301, otherwise ("NO" in step S1303) the device management unit 501 advances the procedure to step S1304.

Step S1304 is executed when the proxy server set in the image forming apparatus 102 is different from the proxy server designated in step S1108. The device management unit 501 of the monitoring apparatus 101 instructs the image forming apparatus 102 to use the proxy server designated in step S1108.

In the second embodiment, the monitoring apparatus 101 periodically monitors the settings of the proxy server of the image forming apparatus 102, and thus, even when the settings of the proxy server are changed, it is possible to return to normal monitoring.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-185753, filed Nov. 21, 2022, which is hereby incorporated by reference herein in its entirety.

What is claimed is:

1. A monitoring apparatus for monitoring a device, the monitoring apparatus comprising:
a memory storing instructions; and
a processor that executes the instructions to:
manage the device, which is a management target to be monitored, based on a list obtained from a management system that includes an authorization service for performing authorization processing;
periodically obtain, from the device, a state of registration of the device to the management system, the state being managed by the device;
specify the device as an unmatched device in a case where the state of registration obtained from the device indicates that the device is not registered;
instruct the unmatched device to transmit, to the authorization service, a request to register the unmatched device to the management system; and
manage whether the state of registration of the unmatched device has changed to indicate that the device is registered, by obtaining the state of registration from the device once or more after the instruction to transmit the request has been given, wherein the managing the state of registration of the unmatched device:
indicates that the device is not registered in a case where the state of registration obtained from the unmatched device does not change to indicate that the device is registered, even after the state of registration is obtained a predetermined number of times.

2. The monitoring apparatus according to claim 1, wherein the processor executes the instructions to instruct the device to use a designated proxy server.

3. The monitoring apparatus according to claim 2, wherein:
the processor periodically obtains settings of a proxy server from the device, and
in a case where a proxy server set in the device is different from the designated proxy server, the processor instructs the device to use the designated proxy server.

4. The monitoring apparatus according to claim 2, the processor executes the instructions to monitor communication data that is transmitted or received by the device via the designated proxy server.

5. A method of controlling a monitoring apparatus that monitors a device, the method comprising:
managing the device, which is a management target to be monitored, based on a list obtained from a management system that includes an authorization service for performing authorization processing;
periodically obtaining, from the device, a state of registration of the device to the management system, the state being managed by the device;
specifying the device, as an unmatched device in a case where the state of registration obtained from the device indicates that the device is not registered;
instructing the unmatched device to transmit, to the authorization service, a request to register the unmatched device to the management system; and
managing whether the state of registration of the unmatched device has changed to indicate that the device is registered, by obtaining the state of registration from the device that is a management target once or more after the instruction to transmit the request has been given, wherein the managing includes:
indicating that the device is not registered in a case where the state of registration obtained from the unmatched device does not change to indicate that the device is registered, even after the state of registration is obtained a predetermined number of times.

6. A non-transitory computer readable storage medium storing a program executable by a computer to function as the execute a method of controlling a monitoring apparatus that monitors a device, the method comprising:
managing the device, which is a management target to be monitored, based on a list obtained from a management system that includes an authorization service for performing authorization processing;
periodically obtaining, from the device, a state of registration of the device to the management system, the state being managed by the device;
specifying the device as an unmatched device in a case where the state of registration obtained from the device indicates that the device is not registered;
instructing the unmatched device to transmit, to the authorization service, a request to register the unmatched device to the management system; and
managing whether the state of registration of the unmatched device has changed to indicate that the device is registered, by obtaining the state of registration from the device that is a management target once or more after the instruction to transmit the request has been given, wherein the managing includes:
indicating that the device is not registered in a case where the state of registration obtained from the unmatched device does not change to indicate that the device is registered, even after the state of registration is obtained a predetermined number of times.

* * * * *